United States Patent [19]

Stoll

[11] 4,064,065
[45] Dec. 20, 1977

[54] AQUEOUS SOLUTIONS OF ALKALI METAL HYDROXIDES

[75] Inventor: James W. Stoll, Woodridge, Ill.

[73] Assignee: Nalco Chemical Company, Oak Brook, Ill.

[21] Appl. No.: 694,755

[22] Filed: June 10, 1976

[51] Int. Cl.$^2$ .................................................. C09K 3/00
[52] U.S. Cl. ..................................... 252/192; 252/70; 252/DIG. 9; 423/641
[58] Field of Search .................. 252/192, 70; 423/641; 252/DIG. 9

[56] References Cited

U.S. PATENT DOCUMENTS

| | | | |
|---|---|---|---|
| 2,464,019 | 3/1949 | Bond et al. | 252/192 X |
| 2,470,214 | 5/1949 | Egan | 252/192 |

*Primary Examiner*—Stephen J. Lechert, Jr.
*Attorney, Agent, or Firm*—John G. Premo; Robert A. Miller; Barry W. Sufrin

[57] ABSTRACT

An aqueous solution of alkali metal hydroxides which is composed of:
  A. a 50% by weight aqueous solution of sodium hydroxide, and
  B. a 45% by weight aqueous solution of potassium hydroxide, with the weight ratio of A to B being 2:1.

1 Claim, No Drawings

AQUEOUS SOLUTIONS OF ALKALI METAL HYDROXIDES

INTRODUCTION

Concentrated aqueous solutions of sodium hydroxide are used in hundreds of industrial applications. Typical is pH control for aqueous systems, acid neutralization as catalysts and the like. In many instances, users purchase sodium hydroxide solutions in 55 gal. drums or smaller containers. These solutions have very low freezing points, e.g. about 55° F which means they are incapable of being stored outside during the winter months in many parts of the world. To store concentrated sodium hydroxide solutions indoors requires the loss of valuable storage space. If it were possible to prepare concentrated solutions of alkali metal hydroxides which contained a propenderence of sodium hydroxide which could be stored outside without the danger of freezing, a great convenience would be afforded to users of this product.

THE INVENTION

In accordance with the invention, I have found that an aqueous solution containing alkali metal hydroxides having a freezing point of about 0° F may be readily prepared by mixing together a 50% by weight aqueous solution of sodium hydroxide and a 45% by weight aqueous solution of potassium hydroxide with the weight ratio of the sodium hydroxide solution to potassium hydroxide solution being 2:1. The final solution prepared by mixing these two alkali metal hydroxide solutions has a freezing point of about 0° F.

EXAMPLE

A small amount of 50% by weight aqueous solution of sodium hydroxide was admixed with a smaller amount of a 45% by weight aqueous solution of potassium hydroxide to provide a ratio of sodium hydroxide solution to potassium hydroxide solution. The solutions were then stored in a commercial refrigeration unit, the temperature of which was 0° F. The solution was still liquid after two days of storage.

Having thus described my invention, it is claimed as follows:

1. An aqueous solution of alkali metal hydroxides comprising:
   A. a 50% by weight aqueous solution of sodium hydroxide, and
   B. a 45% by weight aqueous solution of potassium hydroxide, with the weight ratio of A to B being 2:1, said aqueous solution of the alkali metal hydroxides having a freezing point of about 0° F.

* * * * *